United States Patent

Bouton

Patent Number: 5,838,307
Date of Patent: Nov. 17, 1998

[54] COMPUTER SYSTEM WITH RECONFIGURABLE CONTROLLER

[75] Inventor: Frank M. Bouton, Beaverton, Oreg.

[73] Assignee: Thrustmaster, Inc., Hillsboro, Oreg.

[21] Appl. No.: 440,296

[22] Filed: May 30, 1995

Related U.S. Application Data

[60] Continuation of Ser. No. 272,680, Jul. 8, 1994, abandoned, which is a division of Ser. No. 2,828, Jan. 7, 1993, Pat. No. 5,396,267, which is a continuation-in-part of Ser. No. 932,501, Aug. 19, 1992, Pat. No. 5,245,320, which is a continuation-in-part of Ser. No. 911,765, Jul. 9, 1992, abandoned.

[51] Int. Cl.$^6$ ...................................................... G09G 5/00
[52] U.S. Cl. .......................... 345/168; 345/157; 345/172
[58] Field of Search ..................................... 345/156, 157, 345/161, 168, 172; 273/148 B

[56] References Cited

U.S. PATENT DOCUMENTS 4,716,542  12/1987  Peltz et al. ............................... 345/173
4,852,031   7/1989  Brasington ............................... 364/578

*Primary Examiner*—Matthew Luu
*Attorney, Agent, or Firm*—Marger Johnson & McCollom, P.C.

[57] ABSTRACT

A reconfigurable video game/simulator system including a personal computer, a video display, a keyboard, and one or more game controllers including a throttle controller. The keyboard is coupled to the throttle controller as are the other game controllers. The throttle controller is coupled to the computer through a keyboard interface port. During a functional mode, the throttle controller receives inputs from the controllers and the keyboard and transmits a corresponding input keycode. During a reconfiguration mode, the user inputs the desired keycodes into the computer, either by inputting them by the keyboard or selecting a preexisting configuration file stored on the computer. The reconfiguration keycodes are then downloaded to the throttle controller over the keyboard interface. The throttle controller receives the reconfiguration keycodes and stores them in a non-volatile memory located within the controller. During a subsequent functional mode, when one of the input devices is actuated, the corresponding reconfiguration keycode is transmitted to the computer.

23 Claims, 5 Drawing Sheets

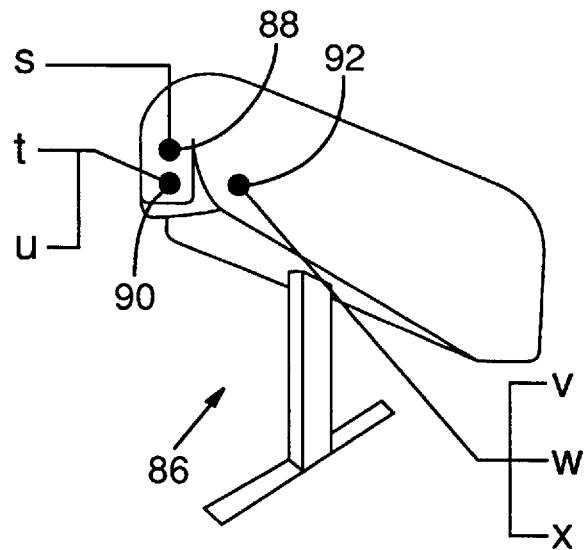
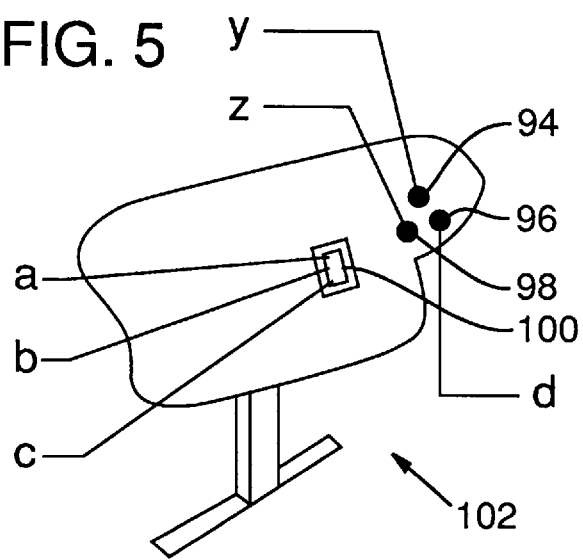

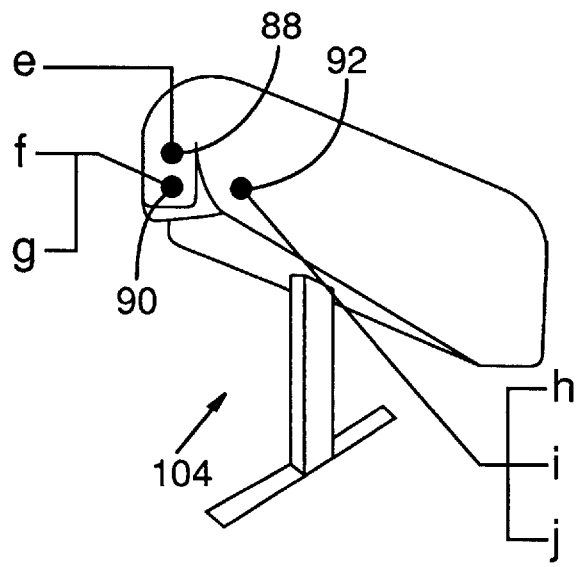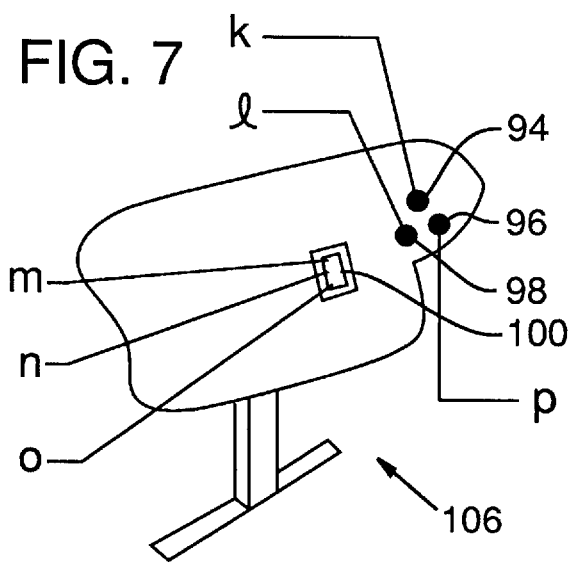

COMPUTER SYSTEM WITH RECONFIGURABLE CONTROLLER

This application is a file wrapper continuation of application Ser. No. 08/272,680, filed Jul. 8, 1994, now abandoned which is a division of application Ser. No. 08/002,828, filed Jan. 7, 1993, now U.S. Pat. No. 5,396,267, which is a continuation-in-part of U.S. application Ser. No. 07/932,501, filed Aug. 19, 1992, now U.S. Pat. No. 5,245,320, issued Sep. 14, 1993, which is a continuation-in part of U.S. application Ser. No. 07/911,765, filed Jul. 9, 1992, now abandoned.

BACKGROUND OF THE INVENTION

This invention relates generally to controllers for video games and simulators implemented on a computer and more particularly to reconfiguring game controllers to correspond to a particular video game.

Conventionally, a personal computer is enabled to be controlled by external manual control devices by means of a game card, which provides an external game port into which control devices, such as a joystick, can be plugged. To provide widespread compatibility, which is essential to the ability to mass market a wide variety of video games and simulation programs, industry standards have been developed for game cards for personal computers such as those commonly referred to as IBM-compatibles. The universal adoption of these standards means that any external manual input device designed to control such computers and software must be compatible with the industry-standard game port. Any input device lacking such compatibility will not be able to be used with conventional personal computers equipped with standard game boards and will not be widely accepted.

The problem is that the industry standard game port provides only a limited number of inputs: four discrete signal inputs for receiving binary signals signifying "On" and Off" and four analog signal inputs for receiving variable voltage signals, such as output by a potentiometer, which are continuously variable over a limited range. The number of game boards that can be plugged into a conventional PC is also limited, to one. Consequently, the number of controllers supported by a standard game port, and the number of allowable functions communicated thereby, is severely restricted.

For example, a PC configured as a combat aviation video game/simulator as shown in FIG. 1 has a joystick controller and a foot-pedal rudder controller. The joystick conventionally has a handle pivotally coupled to a base for forward/rearward movement and left/right movement by the user. The handle is connected in the base to transducers such as potentiometers coupled to two of the analog inputs of the game port to input proportional signals to the PC microprocessor to control analog functions in the video game/simulation program. The handle also includes four discrete switches that are operable by the user's fingers to control discrete functions in the video game/simulation program. The joystick controller therefore consumes two of the analog inputs and all four of the discrete inputs.

Attempting to circumvent these limitations, video game and simulator programmers have implemented many commands by programming function keys on the PC keyboard. This approach detracts from the realism of simulation, which is particularly important to flight simulation video games. Developers have strived to attain more realism by designing microprocessor-based input devices which output keycodes to the PC keyboard port emulating function keys on the PC keyboard. One example is disclosed in U.S. Pat. No. 4,852,031 to Brasington. Thrustmaster, Inc. has also marketed a single throttle controller that outputs keycodes to the PC keyboard port. These efforts have been successful but require a manufacturer to design the controller to transmit a unique keycode for each individual controller input function.

There is no standard set of keycodes throughout the video game industry. Each video game has its own set of keycodes that it recognizes, with each keycode effectuating a corresponding response within the video game. Efforts to convert the keycodes supplied by the manufacturer to those desired by the video game program typically require a terminate-and-stay-resident ("TSR") program running on the computer concurrently with the video game. TSRs consume valuable memory and can potentially conflict with existing programs.

Another method of providing compatibility with new or existing video games requires the manufacturer to supply an updated version of the controller firmware to the user, usually in the form of a programmable-read-only-memory ("PROM"). This technique has several disadvantages. The first is that there is additional expense to the manufacturer in providing the updated firmware, which is ultimately passed on to the user. The second disadvantage is that most video game users are either unqualified or unwilling to install the PROM into their game controller. Installing the PROM incorrectly can render the controller inoperable by damaging the PROM or other electronic components due to electrostatic-discharge ("ESD").

Moreover, many video game users are simply unwilling to disassemble their game controllers for fear of damaging the device.

Accordingly, a need remains for a better way to reconfigure video game controllers for each particular video game to transmit the keycodes corresponding to each video game.

SUMMARY OF THE INVENTION

It is, therefore, an object of the invention is to enable the user to reconfigure their video game controllers to match the user's video game/simulator of choice.

Another object is to enable the user to reconfigure their video game controllers to match the users's individual preference for location of desired functions on the controller.

A further object of the invention is to eliminate the need for a terminate and stay resident ("TSR") program running on the computer for use with the video game controllers.

The invention enables the individual switches and input devices of the game controllers to be reconfigured to match a target video game format. The video game/simulator system includes a personal computer running a video game program during a functional mode and a reconfiguration program during a reconfiguration mode. The video system can include several game controllers such as a joystick, a throttle controller, and a foot-pedal rudder controller. The throttle controller includes circuitry which acts as both a video game controller and a reconfiguration engine. The throttle controller is coupled to a keyboard to receive reconfiguration keycodes during a reconfiguration mode and input keycodes during a functional mode. The throttle controller is also coupled to the joystick controller to receive joystick input signals over a conventional game board connector attached to the joystick controller. The throttle controller is then coupled to a keyboard interface port on a personal computer to send keycodes corresponding to the inputs received by the controller, including its own, during the functional mode. The input keycodes correspond to those required by the particular video game/simulation program to effectuate a user's desire response to the program. The personal computer downloads reconfiguration keycodes to the throttle controller over the keyboard interface port during the reconfiguration mode. The throttle controller reconfiguration engine reconfigures the input devices of the game controllers so as to transmit a keycode downloaded to correspond to a particular controller input when that input is actuated.

A reconfiguration program runs on the personal computer prior to invoking the video game program. The reconfiguration program presents a graphical representation of the individual game controllers and allows the user to input a keycode corresponding to each of the controller inputs. The user can either type the keycodes in individually or, alternatively, specify a pre-stored file including previously entered keycodes. Thus, the user can save separate reconfiguration file for a number of separate video games. The reconfiguration program further allows the user to calibrate the game controllers during the reconfiguration mode. Finally, the reconfiguration program downloads the keycodes to the throttle controller circuitry to be stored in a non-volatile memory so as to retain the last set of downloaded keycodes even after the video program has been terminated.

An advantage of the invention is the ability to provide both analog and digital throttle, pitch, and roll to the computer.

Another advantage of the invention is to retain the configuration information even after the video program has been terminated.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4 is a two-dimensional graphical display of a frontal view of the throttle controller of FIG. 1 as displayed on a video display prior to reconfiguration.

FIG. 5 is a two-dimensional graphical display of a rear view of the throttle controller of FIG. 1 as displayed on a video display prior to reconfiguration.

FIG. 6 is a two-dimensional graphical display of a frontal view of the throttle controller of FIG. 1 as displayed on a video display after reconfiguration.

FIG. 7 is a two-dimensional graphical display of a rear view of the throttle controller of FIG. 1 as displayed on a video display after reconfiguration.

DETAILED DESGRIPTION

Figure 1:
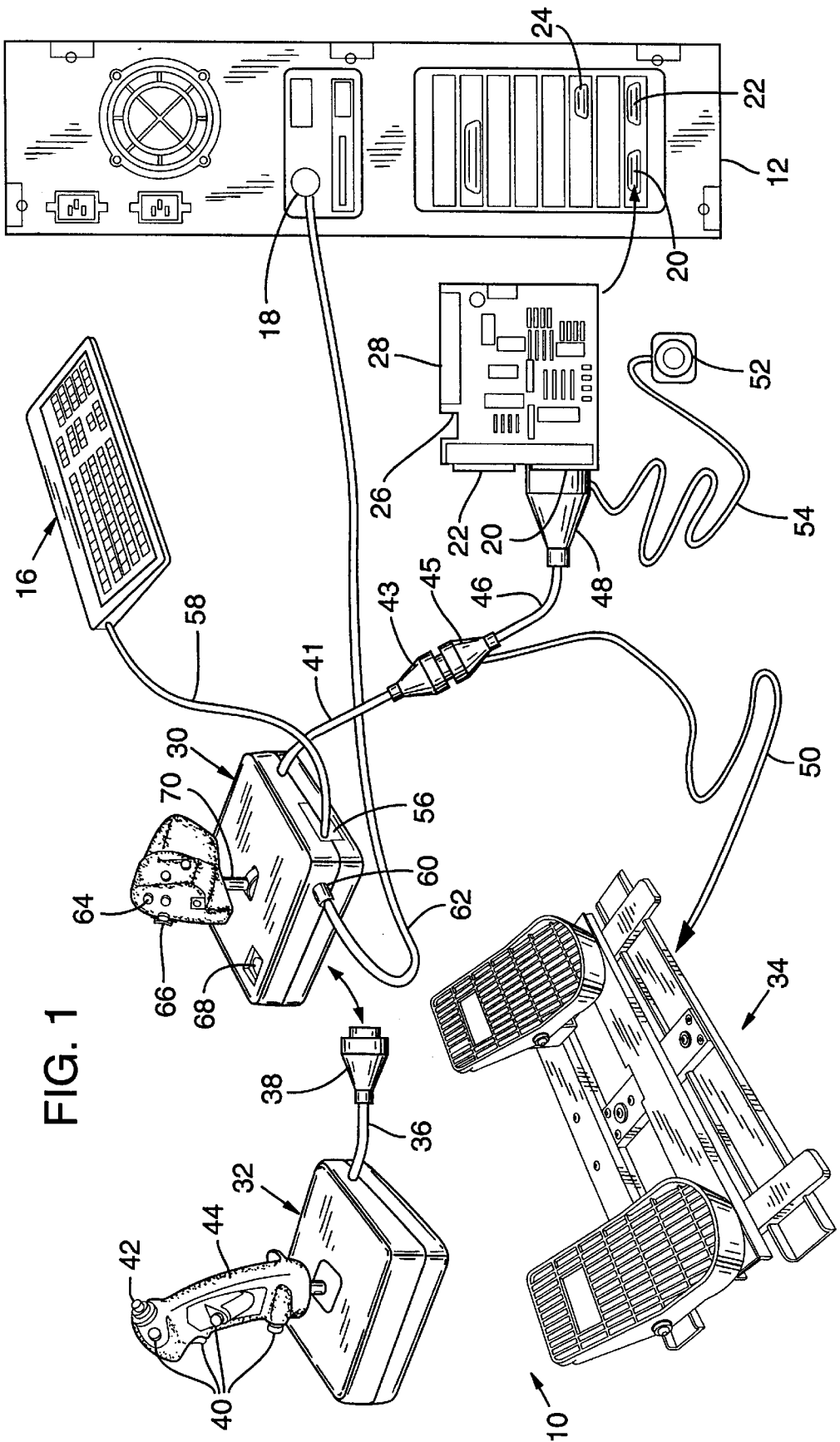
FIG. 1 is a perspective view of a video game/simulator system including a personal computer and several game controllers connected according to the invention.
Figure 8:
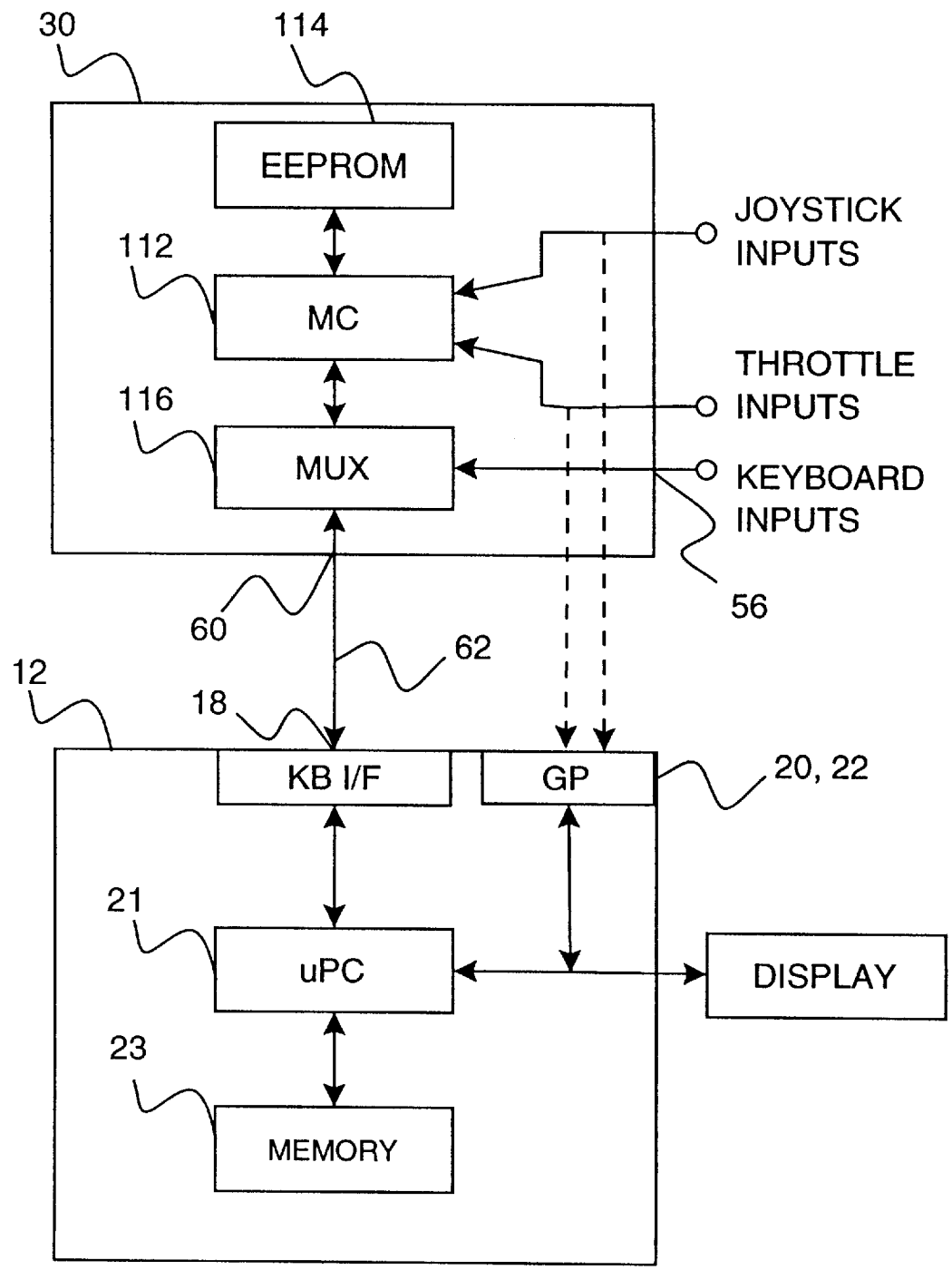
FIG. 8 is a simplified block diagram of the throttle controller electronics and personal computer electronics in the system of FIG. 1.

FIG. 1 shows a video game/simulation system 10 for simulating operation of a complex system having a plurality of user-controlled functions such as a combat aviation video game program. As shown in FIG. 8, the system includes a conventional personal computer 12 having a microprocessor 21 operable under control of a video game/simulation program stored in memory 23 during a functional mode or, according to the invention, operable under control of a reconfiguration program during a reconfiguration mode. The computer also includes an input/output bus (not shown) for connecting peripheral input and output devices, e.g., game card, to the microprocessor. A conventional display (not shown) is used for displaying images produced by operation of the program in the microprocessor, and a conventional keyboard 16. Included on the computer, typically on the backside as shown in FIG. 1, are the input or output ports for the computer. The computer 12 includes a keyboard interface port 18 for, under normal operations, connecting to the keyboard 16. Also included on the computer 12 are two game ports 20 and 22 as well as video output port 24, for connecting to the display (not shown).

The dual game ports 20 and 22 are shown as if game multi-ported game board 26 were inserted into the computer input/output bus (not shown). The multi-ported game board 26 inserts along horizontal guides within the computer such that male edge connector 28 makes electrical contact with the input/output bus of the computer. The multi-ported game board 26 is described further in commonly assigned copending application MULTIPORT GAME CARD WITH CONFIGURABLE ADDRESS Ser. No. 07/932,501 filed Aug. 19, 1992, which is further a continuation in part of copending application VIDEO GAME/FLIGHT SIMULATOR CONTROLLER WITH SINGLE ANALOG INPUT TO MULTIPLE DISCRETE INPUTS Ser. No. 07/911,765 filed Jul. 9, 1992, both of which are incorporated herein by reference.

Preferably, for running aviation video games and simulation programs, both a throttle controller 30 and a joystick controller 32 are connected to the computer, as well as a foot-pedal rudder controller 34. The joystick controller 32 includes a cable 36 having a game port connector 38. The game port connector 38 is connected to a mating game port connector, such as game ports 20 and 22, on throttle controller 30. The joystick controller 32 includes a plurality of input devices including switches 40, joyhat 42, as well as the actual joystick 44. All of the input information is conveyed over the cable 36 to the throttle controller 30 for further processing as described further below.

The throttle controller 30 is shown connected to game port 20 of a game card 26 ultimately residing in the housing of computer 12, as described above. The throttle controller 30 includes a cable 41 having a game port connector 43 at one end. Connected to the connector 43 is a mating game port Y-connector 45 which couples the throttle controller output signals from cable 41 and also the foot-pedal rudder controller position signals from signal line 50 across cable 46 to connector 48 which is connected to game port 20. The foot-pedal rudder controller signal line 50 is coupled to an analog signal line of cable 46 unused by throttle controller 30. Optionally calibration knob 52 is connected to game port 20 is across signal line 54, and is used to calibrate the controller input signals.

The throttle controller 30 further includes keyboard input port 56 which is shown coupled to the keyboard 16 through keyboard output cable 58. The keyboard input port 56 receives the keycodes transmitted from the keyboard 16 across cable 58 responsive to a user depressing one of the keyboard keys. The throttle controller 30 also includes a keyboard input/output port 60 which is coupled to the computer keyboard interface 18 across cable 62.

The throttle controller 30 has a plurality of input devices including discrete switches 64, three-way switches 66 and 68, and throttle 70. The throttle 70 can either be two separate throttle members, i.e., split-throttle, as in the preferred embodiment, or a single throttle member. In addition, throttle controller 30 can include a trackball mounted on the throttle handle near where the thumb naturally rests on the handle, as described in copending application Ser. No. 07/932,501. If the trackball is included, the trackball encoder outputs can be coupled to the serial input 24 of the computer to act as a "mouse" to move a cursor on the computer display (not shown).

Referring now to FIG. 8, within the throttle controller 30 is electronic circuitry necessary to coordinate and translate all of the input and reconfiguration activity. The throttle electronics, in the preferred embodiment, includes a microcontroller 112 which samples the inputs of all of the controller input devices, including its own. The microcontroller is coupled to a non-volatile memory, 114 such as a electrically-erasable, programmable read-only memory ("EEPROM"), where the current active set of keycodes are stored. When the throttle controller detects an actuated input from one of the controllers, the throttle controller 30 indexes into the memory and transmits a keycode corresponding to the actuated input to the computer keyboard interface port. In the event that the keyboard 16 itself is actuated, the throttle controller allows the corresponding keyboard keycode to be passed directly to the computer 12. This multiplexing technique can be accomplished by using either an analog switch or a digital multiplexer 116. Examples of electronics circuitry suitable for transforming input signals to keycodes are described in U.S. Pat. No. 4,716,542 issued to Peltz et al. and U.S. Pat. No. 4,852,031 issued to Brasington.

The present invention allows the game controller inputs that are transmitted on the analog signals, e.g., throttle, roll, and pitch, to either be passed directly to the game port 20, along the analog input lines of the game port 20, or, alternatively, the throttle controller 30 can block the transmission of the analog signals and send a corresponding keycode to the computer 12. The user can select between analog or digital representation by changing the setting of the throttle controller three-way switch 68. In this way, the video system can maintain the increased resolution of the analog inputs while still using digital keycodes for the other controller inputs.

Reconfiguring the Game Controllers

Each joystick input and throttle input initially has a corresponding keycode chosen to match a prevalent video game. In the event that the video game user selects a program which uses keycodes which do not match those supplied by the manufacturer, or the user desires to change the function of one or more of the controller inputs, the user can switch into a reconfiguration mode by invoking a reconfiguration program on the computer 12 and changing the state of the three-way switch 68.

Figure 2:
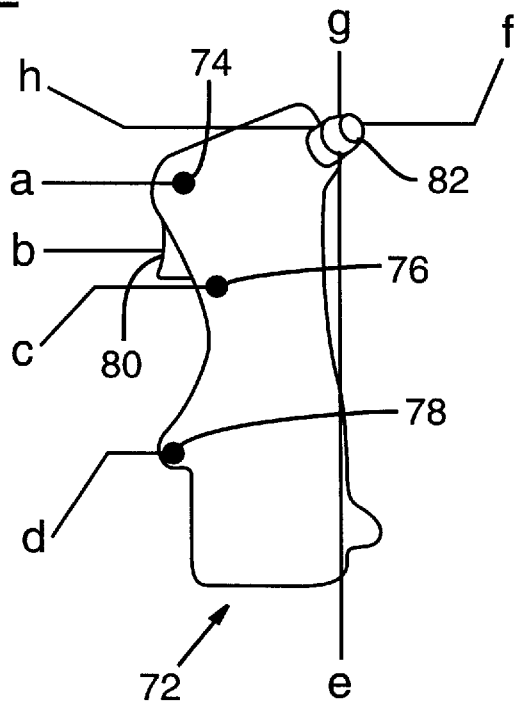
FIG. 2 is a two-dimensional graphical display of the joystick of FIG. 1 as displayed on a video display prior to reconfiguration.

The reconfiguration program presents a graphical representation of each of the game controllers on the display, along with a menu of configuration assignments. FIG. 2 shows such a representation of the joystick, located generally at 72. Each discrete switch 74, 76, 78, and 80 has a separate character associated therewith, "a", "c", "d""b", respectively. Similarly, joyhat 82 has four characters associated with it, i.e., "e", "f", "g", "h", corresponding to the four separate positions of the joyhat 82. The program indicates what keycodes, as represented by the corresponding character, correspond to each input. When the reconfiguration program is initially invoked the inputs will have no characters associated with them since none will have yet been assigned.

Figure 3:
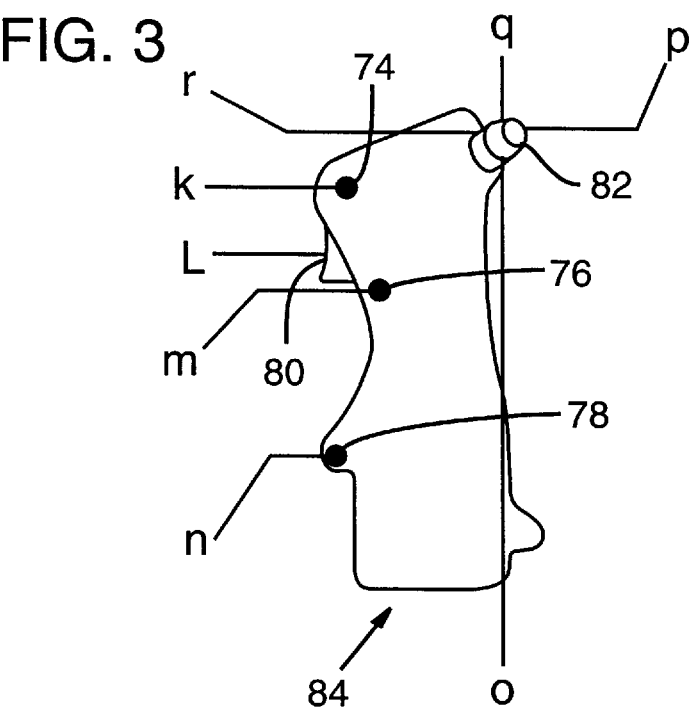
FIG. 3 is a two-dimensional graphical display of the joystick of FIG. 1 after reconfiguration.

The reconfiguration program will prompt the user to input the desired keycodes for each of the controller inputs. In the preferred embodiment, the program simply steps from one input to the next, responsive to the user depressing the desired keyboard character until the user is finished. Referring now to FIG. 3, shown generally at 84 is a graphically representation of the joystick after the joystick inputs have been reassigned. For example, inputs 74, 76, and 78 are reassigned to keycodes "k", "m", and "n", respectively.

Referring now to FIGS. 3–4, a frontal and rear view of the throttle controller are shown generally at 86 and 102, respectively, as shown on the display. As in FIG. 1, each of the throttle inputs has a keycode associated with it. Discrete input switches 88, 94, 96, and 98 have a single keycode associated with them, and three-way switch 100 has a single keycode associated with each switch setting. Input 90, however, has two keycodes associated with it. This corresponding to two of the three switch settings of three-way switch 100. For example, when switch 100 is in a first position, corresponding to keycode "a", discrete input 90 corresponds to keycode "t"; in contrast, when switch 100 is in a second position, corresponding to keycode "b", discrete input 90 corresponds to keycode "u". Similarly, discrete switch 92 has three separate keycodes, "v", "w", and "x", corresponding to the three switch settings "a", "b", and "c", respectively.

Once the desired keycodes have been entered the user commands the reconfiguration program to download the new keycodes to the throttle controller. The computer synchronizes with the throttle controller over the keyboard interface and then transmits a packet of data to the throttle controller over the keyboard port interface 18. In the preferred embodiment, the data packet includes a keycode for each of the controller inputs, each input having a corresponding datum, for example, at a predetermined offset into the packet. In order to avoid contention for the keyboard interface, in the preferred embodiment, the user is prompted to avoid actuating any of the controller inputs of the keyboard.

The throttle controller 30 receives the data packet from the computer 12 and stores the keycodes into the non-volatile memory, 114 where it is stored until the controller is subsequently reconfigured, at which time it is overwritten.

The reconfiguration program also allows the user to calibrate the game controllers by entering a calibration routine and actuating the desired input. In the preferred embodiment, the reconfiguration program prompts the user to position the throttle in a variety of setting, in a predetermined order, and actuate a button to indicate that the throttle is in the desired position. The joystick can be similarly calibrated. The reconfiguration program transmits a command to the throttle controller upon entering the calibration routine to inform the throttle controller of the commencement of the routine. The throttle controller then samples the appropriate input lines corresponding to the controller being calibrated responsive to actuating the input indicated by the program. The throttle controller then calibrates the controller based on the signal levels sampled on the input lines.

After operation of the reconfiguration program has been completed, the user simply exits the program and sets the throttle controller three-way switch 68 to a setting corresponding to the functional mode.

Having described and illustrated the principles of the invention in a preferred embodiment thereof, it should be apparent that the invention can be modified in arrangement and detail without departing from such principles. For example, is should be apparent that the number and type of game controllers can be altered without departing from the scope of the invention.

I claim:

1. A reconfigurable video game/simulator system comprising:

a personal computer having a microprocessor operable under control of a system reconfiguration program during a reconfiguration mode and under control of a video game/simulator program during a functional mode, and a keyboard interface port;

a display coupled to the personal computer for displaying images produced by the reconfiguration and video game programs;

a video game/simulator controller having a plurality of input devices, a keyboard input port, and a keyboard input/output port coupled to the computer keyboard interface port;

a computer keyboard coupled to the controller keyboard input port for inputting reconfiguration keycodes and input keycodes;

means within the controller for transmitting from the controller to the computer predetermined reconfiguration keycodes responsive to actuation of corresponding controller input devices during the functional mode;

means within the computer for receiving the keycodes transmitted from the controller;

means within the computer for transmitting reconfiguration keycodes from the computer to the controller via the keyboard interface port during the reconfiguration mode;

means within the controller for receiving the reconfiguration keycodes from the computer during the reconfiguration mode via the keyboard interface port; and means within the controller for reconfiguring the controller responsive to receiving the reconfiguration keycodes such that the controller transmits a reconfiguration keycode when a corresponding controller input device is actuated.

2. A reconfigurable video game system according to claim 1 wherein the receiving means within the controller comprises a microcontroller and memory for storing the reconfiguration keycodes responsive to receiving the reconfiguration keycodes via the keyboard interface port.

3. A reconfigurable video game system according to claim 1 in which the personal computer includes an input/output bus for connecting peripheral input and output devices to the microprocessor; the system further comprising:

a game board coupled to the input/output bus having a finite number of inputs for receiving and inputting to the microprocessor a first number of analog input signals and a second number of discrete input signals, the video game/simulator controller comprising a number of analog output signal lines not exceeding the first number and a number of discrete output signal lines not exceeding the second number, the signal lines being coupled to the game board inputs.

4. A reconfigurable computer system comprising:

a personal computer having a microprocessor operable under control of a reconfiguration program during a reconfiguration mode and under control of an application program during a functional mode, and having a keyboard interface port;

a display coupled to the personal computer for displaying images produced by the application program;

a controller having one or more input devices and a keyboard input/output port coupled to the computer keyboard interface port;

means within the computer for transmitting reconfiguration keycodes from the computer to the controller via the computer keyboard interface port during the reconfiguration mode;

means within the controller for receiving the reconfiguration keycodes from the computer during the reconfiguration mode;

means within the controller for reconfiguring the controller responsive to receiving the reconfiguration keycodes such that the controller transmits a reconfiguration keycode when a corresponding controller input device is actuated; and means within the controller for transmitting from the controller to the computer a predetermined reconfiguration keycode via the computer keyboard interface port responsive to actuation of a corresponding controller input device during the functional mode.

5. A reconfigurable computer system according to claim 4 in which the controller includes means for selecting between the functional mode and the reconfiguration mode.

6. A method of reconfiguring a video game/simulator system comprising a personal computer having a microprocessor operable under control of a system reconfiguration program during a reconfiguration mode and under an application program during a functional mode, the computer having a keyboard interface port, a display coupled to the personal computer for displaying images produced by the application program, a computer keyboard, and a controller coupled to the keyboard through a keyboard input port and coupled to the computer keyboard interface port through a controller keyboard input/output port, the controller having one or more input devices, and means for selecting between the reconfiguration mode and the functional mode, the method comprising:

selecting the reconfiguration mode;

invoking the reconfiguration program on the computer;

inputting reconfiguration keycodes into the computer during the reconfiguration mode, each reconfiguration keycode corresponding to one of the controller input devices;

downloading the reconfiguration keycodes from the computer to the controller;

reconfiguring each of the controller input devices responsive to receiving the reconfiguration keycodes such that the controller transmits a predetermined reconfiguration keycode corresponding to an input device when the input device is actuated in the functional mode; and storing the reconfiguration keycodes in a non-volatile memory within the controller for use in the functional mode.

7. A method of reconfiguring a video game/simulator system according to claim 6 wherein the step of inputting reconfiguration keycodes comprises inputting the reconfiguration keycodes from the keyboard.

8. A method of reconfiguring a video game/simulator system according to claim 6 wherein the step of inputting reconfiguration keycodes comprises inputting the reconfiguration keycodes from a prestored reconfiguration file.

9. A method of reconfiguring a computer system according to claim 6 in which the reconfiguration keycodes are downloaded from the computer to the controller via the keyboard interface port.

10. A method of reconfiguring a video game/simulator system according to claim 6 wherein the step of setting the controller in the reconfiguration mode includes setting a switch on the controller from a second state corresponding to the functional mode to a first state corresponding to the reconfiguration mode.

11. A method of reconfiguring a video game/simulator system according to claim 6 wherein the step of inputting reconfiguration keycodes into the computer during the reconfiguration mode comprises displaying a graphical representation of the controller on the display.

12. A method of reconfiguring a video game/simulator system comprising a personal computer having a microprocessor operable under control of a system reconfiguration program during a reconfiguration mode and under a video game program during a functional mode, the computer having an input/output port, a display coupled to the personal computer for displaying images produced by the programs, a computer keyboard, and a video game/simulator controller coupled to computer via the input/output port, the controller having a plurality of input devices, the method comprising:

in the reconfiguration mode, displaying on the display a representation of the controller including the controller input devices;
  selecting one of the controller input devices;
  displaying an entry field for the selected one of the input devices on the representation of the controller;
  inputting a set of one or more reconfiguration keycodes into the computer and thence into the displayed entry field thereby associating the set with the selected controller input device;
  storing the set of inputted reconfiguration keycodes in association with the selected controller input device; and
  in the functional mode, responsive to each actuation of the selected input device on the controller, presenting the set of associated keycodes to the video game program as though they were keyed by the user on the computer keyboard.

13. A method of reconfiguring a video game/simulator system according to claim 12 wherein the steps of selecting one of the input devices and inputting and storing reconfiguration keycodes in association with the selected input devices includes:

designating the selected one of the input devices on the computer display; and
  inputting one or more reconfiguration keycodes for the designated input device via the keyboard into the entry field for the designated input device.

14. A method of reconfiguring a video game/simulator system according to claim 13 wherein the step of inputting reconfiguration keycodes into the computer includes repeating the steps of designating one of the input devices and inputting one or more reconfiguration keycodes for the designated input device for each of the input devices.

15. A method of reconfiguring a video game/simulator system according to claim 12 wherein the step of inputting reconfiguration keycodes into the computer includes specifying a reconfiguration file, stored in a memory of the computer, so that the entire set of associations of input devices and keycodes can be retrieved and activated later.

16. A reconfigurable video game/simulator system comprising:

a personal computer having a microprocessor and a memory;
  a display coupled to the personal computer for displaying images;
  a controller having multiple input devices and being coupled to the personal computer to input a keycode to the computer responsive to actuation of one of the input devices;
  means within the computer for displaying an image representing the controller on the display;
  means within the computer for displaying an entry field for each input device;
  means within the computer for receiving and storing a set of reconfiguration keycodes for the input devices, and
  means for receiving a reconfiguration keycode within each entry field.

17. A reconfigurable video game/simulator system comprising:

a personal computer having a microprocessor;
  a display coupled to the personal computer for displaying images;
  a controller having one or more input devices and being coupled to the personal computer;
  means within the computer for displaying an image representing the controller, including the input devices, on the display;
  means within the computer for receiving reconfiguration keycodes for the input devices including:
    means within the computer for receiving reconfiguration keycodes stored in a reconfiguration file; and
    means within the computer for associating each reconfiguration keycode with a corresponding input device.

18. A reconfigurable video game/simulator system according to claim 17 wherein the controller includes:

a switch having a first state and a second state; and
  means for selecting between two sets of reconfiguration keycodes for the controller input devices responsive to the state of the switch.

19. A reconfigurable video game/simulator system according to claim 17 wherein the means within the computer for receiving reconfiguration keycodes for the input devices includes means for receiving two sets of reconfiguration keycodes for an input device.

20. A reconfigurable video game/simulator system according to claim 17 wherein the controller includes a multi-position input device and wherein the means within the computer for receiving reconfiguration keycodes for the input devices includes means for associating a different set of reconfiguration keycodes with the input device for each position of the multi-position input device.

21. A reconfigurable video game/simulator system according to claim 17 wherein the controller is a joystick controller.

22. A reconfigurable video game/simulator system according to claim 17 wherein the controller is a throttle controller.

23. A reconfigurable video game/simulator system according to claim 17 including means within the computer for activating the association of the sets of reconfiguration keycodes with the corresponding input devices so as to re-establish a previous reconfiguration.

* * * * *